Sept. 5, 1933.  C. E. GRUNSKY  1,925,531

VALVE

Filed Aug. 20, 1930

INVENTOR.
Earl Ewald Grunsky.
BY
Townsend, Loftus & Abbett
ATTORNEYS.

Patented Sept. 5, 1933

1,925,531

UNITED STATES PATENT OFFICE 1,925,531

VALVE

Carl Ewald Grunsky, San Francisco, Calif.

Application August 20, 1930. Serial No. 476,467

2 Claims. (Cl. 137—139)

This invention relates to valves such as are placed in pipe lines or the like to regulate or shut off the flow of a fluid therethrough, and especially to a sleeve type of valve.

The object of the present invention is to generally improve and simplify the construction and operation of valves of the character described; to provide a valve which may be readily inserted in a pipe line; to provide a valve which is adapted for high pressure pipe lines; to provide a valve which may be opened or closed with a minimum of power, regardless of the pressure in the line; to provide a valve which is substantially hydraulically balanced so that the amount of power required to open or close the valve need not be much in excess of that required to overcome friction between the moving parts; to provide a valve which may be either hydraulically or manually opened or closed; to provide a valve which insures a smooth flow and a gradual change in the amount of flow of fluid both during opening and closing of the valve whereby water hammer or vibration can be eliminated; to provide a valve in which leakage is reduced to a minimum; and, further, to provide means exterior of a valve whereby the position of the valve will at all times be visibly indicated.

The valve is shown by way of illustration in the accompanying drawing, in which—

Figure 1:
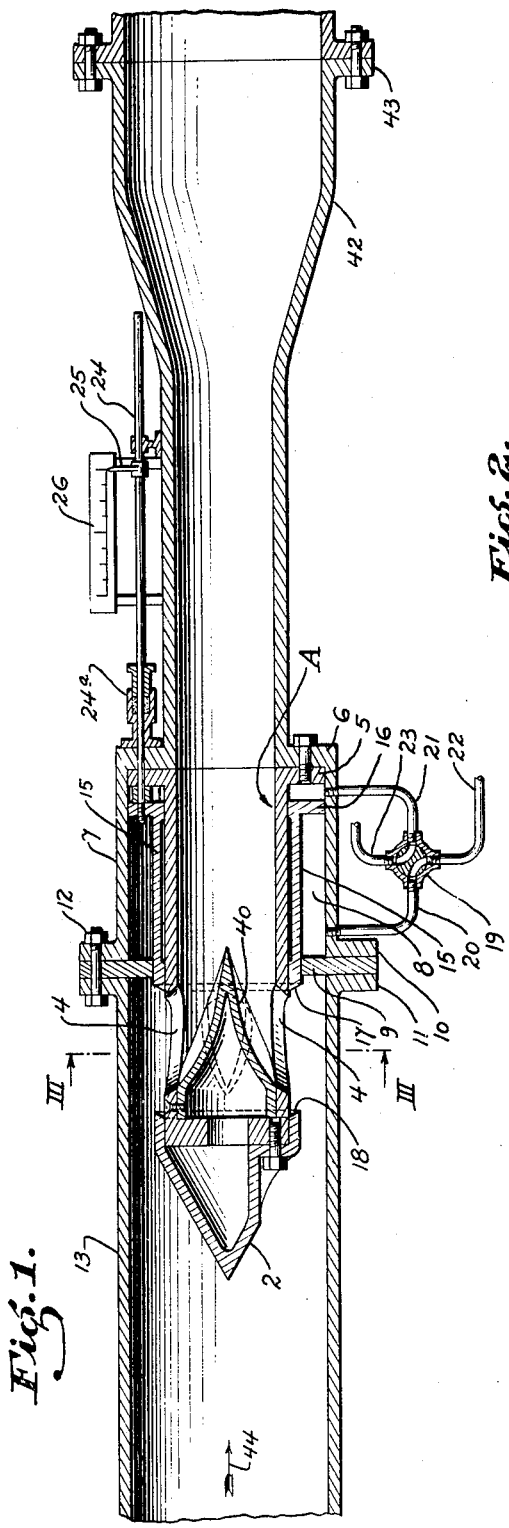
Fig. 1 is a central, vertical, longitudinal section of the valve.

Referring to the drawing in detail, and particularly Fig. 1, A indicates an inner cylindrical-shaped elongated housing, one end of which is closed by means of the cone-shaped head member 2. Formed in the housing A adjacent the head member 2 and just rearwardly thereof are a plurality of symmetrically disposed radial flow inlet ports 4 forming openings through the shell of the inner housing. The opposite end of the housing A is open, and on the assumption that the flow is in the direction from left to right as shown by arrows 44, forms the discharge end thereof. It is provided with an annular outwardly projecting flange 5 and it is secured by bolts or other suitable means to the end 6 of an outer cylindrical-shaped annular housing 7. This housing is large in diameter and an annular circumferential chamber 8 is accordingly formed between the housings, one end of this circumferential chamber being closed by the flange 5 and end section 6, while the opposite end is closed by means of a ring-shaped plate 9 secured between flanges 10 and 11, the flanges and the plate 9 being secured together by bolts or other suitable means indicated at 12. Flange 11 is formed on one end of an inlet pipe 13, while flange 10 is formed on the forward end of the outer housing section 7. When the valve is inserted in a pipe line to control flow therein, the housings as here described, will form a part thereof.

Surrounding the inner housing section A and slidably mounted thereon is a cylindrical-shaped sleeve valve 15. One end of the valve is provided with a piston member 16, while the opposite end is provided with a seat 17 which is adapted to engage a fixed annular seat 18 formed at the rear end of the head member 2. Longitudinal movement is transmitted to the piston 16 and the sleeve valve 15 by means of a four-way valve or the like, indicated at 19. This valve is connected by means of two pipes 20 and 21 with opposite ends of the cylinder chamber 8, and the valve is also provided with a supply pipe 22 and a waste pipe 23. Fluid under pressure may be delivered to pipe 22 from any suitable source, for instance, the pipe line 13, providing this carries the fluid under sufficient pressure. Hence, when it is desired to open or close the valve, it is merely necessary to admit fluid under pressure behind one end or the other of the piston and release the fluid behind the opposite end, and as the piston moves, sleeve valve 15 will also move and the radial inlet ports 4 will accordingly be opened or closed. When moved to closed position, the seat members 17 and 18 engage in such a manner as to provide a substantially leak-proof seat. To make the valve leak proof the end of the sleeve farthest removed from the ring seat may be provided with a stuffing box 45.

The piston 16 is provided with a rod 24 which projects through the stuffing box 24a. The outer end of the rod carries a pointer 25 and this moves over an indicating scale 26, said pointer and scale visibly indicating at all times the position of the sleeve valve.

Figure 2:
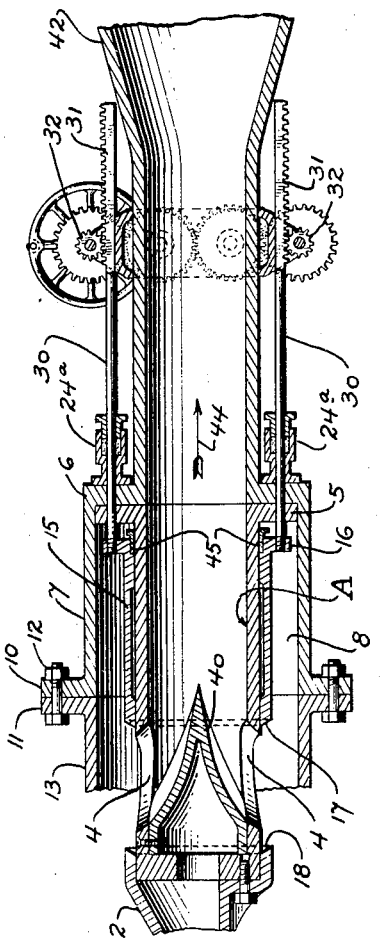
Fig. 2 is a detail section showing how the valve may be manually opened and closed.

By referring to Fig. 2, a modified form of valve operating mechanism is shown. In this instance head member 9 may be entirely eliminated and in place of employing a piston such as shown at 16, an annular flange may be provided for convenient attachment to the sleeve of one or more rods such as shown at 30 extending through stuffing boxes 24a. These rods terminate in rack bars 31 and the rack bars are engaged by gears 32 which may be rotated by a hand crank or any other suitable mechanism. Hence, it is also possible to manually open and close the sleeve valve, if desired.

Figure 3:
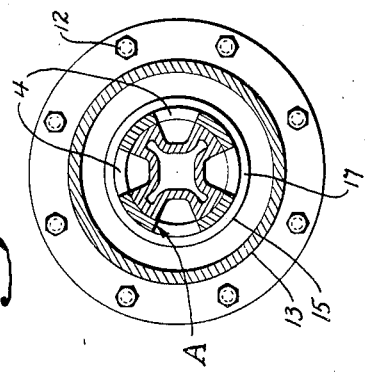
Fig. 3 is a cross section taken on line III—III of Fig. 1.

By referring to Figs. 1 and 3, it will be noted that the radial inlet ports 4 are V-shaped at their forward ends and it will also be noted that a cone-shaped head member 40 is placed within the inner housing at a point rearwardly of the cone-shaped head 2. The head 40, together with the V-shaped ports 4, insures a gradually increasing and smooth flow of the water or other medium handled as the valve opens. It eliminates all eddy or swirling actions at the beginning of an opening and at the finish of a closing movement and, thereby insures a smooth operating valve in which water hammer or vibration can be entirely eliminated. Leakage can be reduced to a minimum due to the engagement of the annular seat 17 with 18 when the valve is closed and also due to the fact that the inlet ports 4 are completely covered when the sleeve valve assumes closed position leaving only the circumferential sliding contact at the rear end of the sleeve to be made tight either by sufficiently careful workmanship on the inner housing at the point where the rear end of the sleeve comes to rest when the valve is in a closed position, or by providing a stuffing box 45 on that end of the sleeve. The amount of power required to operate the sleeve valve will in most instances not exceed that required to overcome the friction of the moving parts, this being particularly true of the structure shown in Fig. 2. With the structure shown in Fig. 1 a slightly unbalanced condition may exist, but as this type is hydraulically actuated, it is of no material importance as it is only during the closing operation that the slight increase in power is required and this is taken care of by the larger area presented by the rear face of the piston. Pipe 13 forms a part of the pipe line in which the valve is inserted and it ordinarily forms the intake side of the valve. Pipe 42 is a special pipe which in this instance is shown as an extension of the outer housing. It, however, may terminate in a flange such as shown at 43 or otherwise, to be joined to the pipe line if it is continued. Otherwise, it will form the discharge outlet of the valve.

While certain features of the present invention are more or less specifically described, I wish it understood that the direction of flow may be in either direction and that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a valve consisting of an outer cylindrical housing and an inner cylindrical housing having an annular flow space therebetween, an annular valve seat around the inner housing, said inner housing having radially disposed ports formed therein, a cylindrical valve slidably mounted on the inner housing, means for sliding said valve on said housing to close said ports, said ports being tapered in shape to effect a longitudinal contraction of their width to points at their ends nearest to the valve seat, thereby controlling the rate at which the flow area through the ports is increased on opening and is decreased on closing the ports, and causing a gradual increase and reduction in the amount of flow when the valve is opened or closed, and a sufficient length of the inner housing between the ports and the valve seat to permit the sliding valve to completely shut off the flow before it engages the seat, and guide vanes within the inner housing, arranged to conform to the edges of the ports and forming tapering grooves to provide gradual transition of flow space from the openings to the full dimensions of the inner housing and to compel smooth flow of the liquid through the valve.

2. In a valve of the character described which includes a cylindrical housing having radially disposed ports formed therein, a cylindrical valve slidably mounted on said housing, means for sliding the valve on the housing to close said ports, said ports being tapered in shape to effect a longitudinal contraction of their width to points at their ends that are last closed by the valve, thereby controlling the rate at which the flow area through the ports is increased on opening and decreased on closing and causing gradual increase and reduction in the amount of flow when the valve is opened and closed, and guide vanes within the housing arranged to conform to the edges of the ports and forming tapering grooves to provide gradual transition of flow space from the openings to the full dimensions of the interior of the housing to insure smooth flow of liquid through the valve.

CARL EWALD GRUNSKY.